United States Patent [19]
Beguin et al.

[11] 3,897,685
[45] Aug. 5, 1975

[54] MEDICAL THERMOMETER

[76] Inventors: Rene Beguin, 9 chemin des Vignettes, Conches, Chene-Bougeries (Canton of Geneva); Hermann Pfeifer, 3 chemin du Foron, Moillesulaz, Chene-Thonex (Canton of Geneva), both of Switzerland

[22] Filed: Oct. 29, 1973

[21] Appl. No.: 410,918

[30] Foreign Application Priority Data
Nov. 10, 1972 Switzerland..................... 16368/72

[52] U.S. Cl. ........................................... 73/362 AR
[51] Int. Cl. ............................................. G01k 7/24
[58] Field of Search ............................... 73/362 AR

[56] References Cited
UNITED STATES PATENTS

| | | | |
|---|---|---|---|
| 3,139,753 | 7/1964 | Brudner | 73/362 AR |
| 3,461,724 | 8/1969 | Tong et al. | 73/362 AR |
| 3,545,273 | 12/1970 | Friberg et al. | 73/362 AR |

Primary Examiner—Richard C. Queisser
Assistant Examiner—Frederick Shoon
Attorney, Agent, or Firm—Kurt Kelman

[57] ABSTRACT

A medical thermometer comprises a probe containing a thermistor, connected in a resistance-comparing bridge forming part of an electrical circuit. The electrical circuit includes means for detecting balance of the bridge and control means for an electric motor. When a thermometer is activated to measure the probe temperature, a potentiometer wiper is first moved by motor driven means from a lower temperature limit to its other limit and is then moved in the opposite direction until balancing of the bridge is detected whereupon the motor is stopped.

2 Claims, 7 Drawing Figures

MEDICAL THERMOMETER

This invention relates to a medical thermometer.

Thermometers are known which comprise a probe containing a thermistor disposed in a resistance-comparing bridge comprising the thermistor and a balancing potentiometer, with an electric motor adapted to move a potentiometer-regulating means in order to bring the bridge into a state of equilibrium, depending on the resistance of the thermistor.

It is an object of this invention to provide a thermometer of the aforementioned kind which is suitable as a compact, portable, medical thermometer.

According to the invention there is provided a medical thermometer comprising a probe containing a thermometer, an electric motor, a potentiometer having a wiper movable between two extreme limit abutments, a mechanical digital counter, driving means for said potentiometer wiper including an electric motor means coupling said counter mechanically with the potentiometer for indicating the position of the potentiometer wiper, an electrical circuit power supply means, and a resistance-comparing bridge connected in said electrical circuit. The thermistor and potentiometer are included in the bridge. Thus, for temperatures between upper and lower limits, the bridge can be balanced by a corresponding setting of the potentiometer. Balance detecting means are disposed in the electrical circuit for detecting balancing of the bridge, along with control means operable by said balance detecting means for arresting the potentiometer wiper and the driving means when balancing is detected. Further means are included which place the thermometer in a starting position in which the potentiometer wiper is at one of its limit abutments and to cause the driving means thereafter to move the potentiometer wiper towards its other limit abutment. The driving means includes means for reversing the movment of the potentiometer wiper when the other limit abutment is reached. Means are also included to render the control means inoperative for arresting the potentiometer wiper and driving means during movement of the potentiometer wiper between said limits and rendering the control means operative during movment of the potentiometer wiper in the opposite direction whereby the potentiometer wiper and driving means are arrested when balance is detected during the latter movment. The counter displays the temperature of the probe.

The accompanying drawings show two exemplary embodiments of the thermometer according to the invention.

In the drawings:

FIG. 1 is a longitudinal section of a first embodiment, taken along line 1—1 of FIG. 2.

FIG. 2 is a section taken along line 2—2 of FIG. 1.

Figures 1, 2, 3, 4:
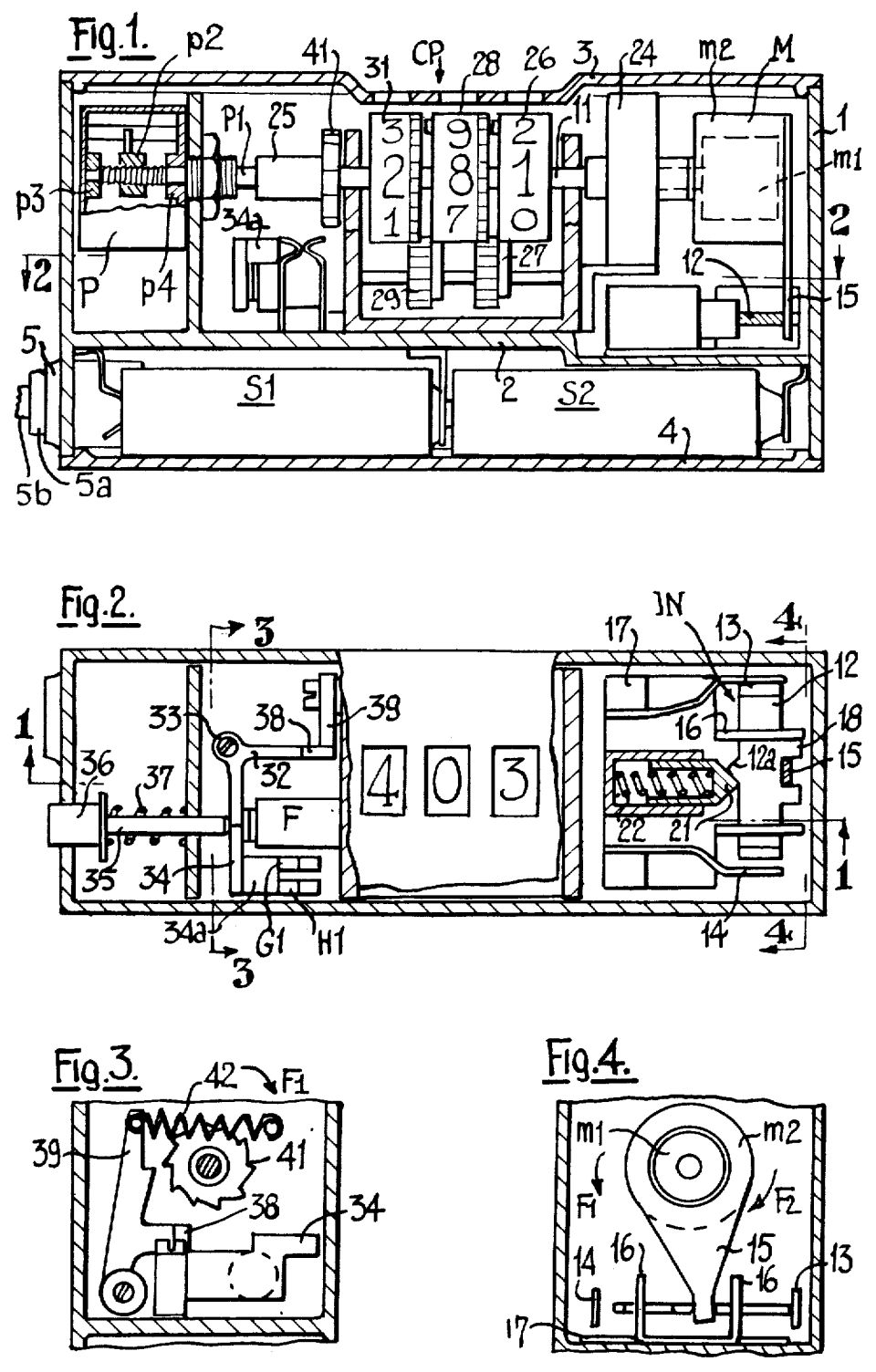

FIGS. 3 and 4 are sections taken along lines 3—3 and 4—4 respectively of FIG. 2.

Figure 5:
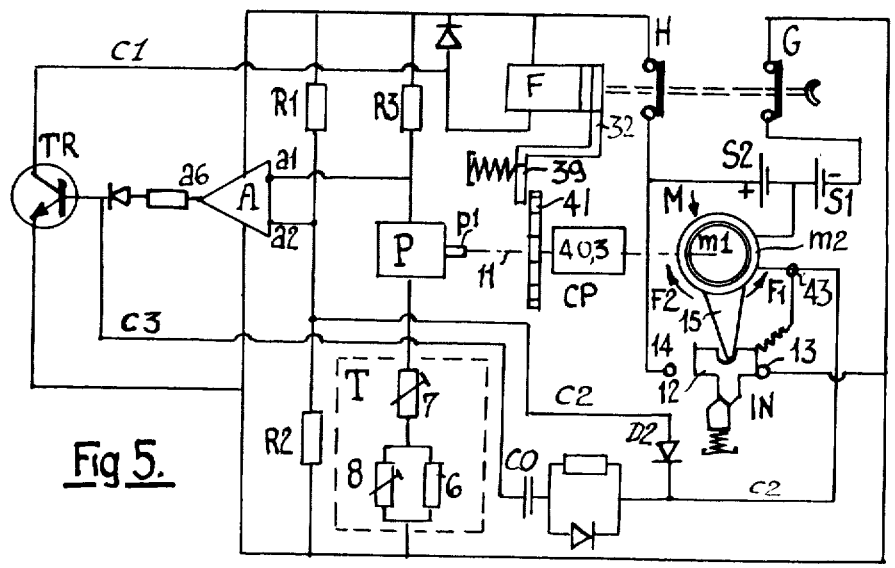

FIG. 5 shows the electric circuit of the thermometer shown in FIGS. 1–4.

Figure 6:
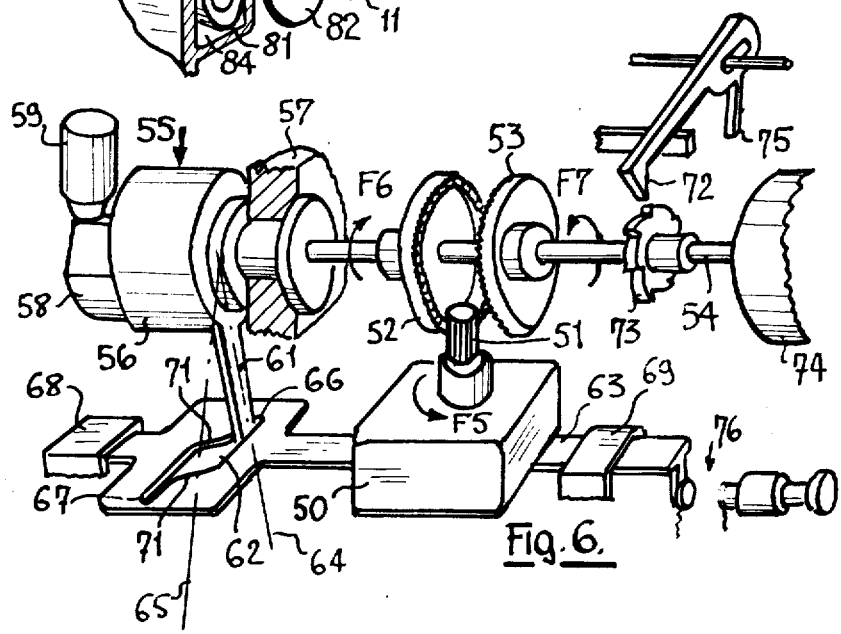

FIG. 6 is a partial perspective view of the second embodiment, and

Figure 7:
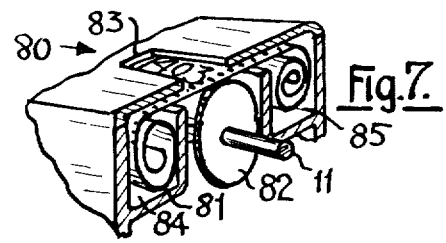

FIG. 7 is a partial perspective view of an alternative embodiment.

The thermometer shown in FIGS. 1–4 comprises a casing 1 having two compartment separated by a wall 2, and closed by removable covers 3 and 4.

Casing 1 comprises a power socket 5 adapted to receive a removable plug 5a connecting the casing to a thermal probe T (FIG. 5) disposed at the end of a flexible cable 5b (FIG. (FIG. 1).

The electric circuit of the thermometer is shown in FIG. 5. Probe T comprises a thermistor 6 disposed in a comparison circuit forming a conventional Wheatstone bridge. The bridge comprises probe T, comprising a thermistor 6 and two regulating resistors 7, 8, a balancing potentiometer P in series with the probe, and three resistors R1, R2 and R3. The bridge is energized by a current source comprising two cells S1 and S2, when two switches G and H are closed.

An operational (differential) amplifier A connected across the bridge energizes an electro-magnetic relay F via a transistor TR. When the voltage at $a1$ is greater than the voltage at $a2$, the potential at $a6$ is positive, whereas when the voltage is higher at $a2$, the potential at $a6$ is negative. If the potential at $a6$ and at the base of transistor TR is positive, relay F is energized by a circuit C1, whereas the power is cut off if the potential at $a6$ is negative.

The potentiometer P, used as a variable resistor, which is of a known kind, comprises a wiper $p2$ (FIG. 1) actuated by a regulating means comprising a rotating control shaft $p1$ which turns through 10 revolutions between the two limit positions of wiper $p2$, which are marked by abutments $p3$ and $p4$ limiting the possible rotation of shaft $p1$ (FIG. 1).

Potentiometer P is actuated by an electric motor M. The control shaft $p1$ thereof is mechanically coupled by a shaft 11 to the rotor m1 of a motor M. Rotor m1 rotates in one or the other direction, depending on the position of a reversing mechanism IN (FIG. 5). When the reversing mechanism is in the position shown in FIG. 5, in which contact is made by a movable element 12 of mechanism IN on the right terminal 13 thereof, motor M is energized by cell S1 when switch G is closed, and its rotor M1 rotates in a direction indicated by arrow F1 such that the adjustment of potentiometer P is modified so as to increase the resistance of the potentiometer.

If, on the contrary, contact is made on the left terminal 14 of the reversing mechanism, motor M is driven by cell S2 and its rotor m1 rotates in the other direction, indicated by arrow F2, thus modifying the adjustment of potentiometer P in the direction of decreased resistance.

The stator m2 of motor M, which is not stationary, comprises an arm 15 cooperating with elements 12 of the reversing mechanism. As shown in FIGS. 1, 2 and 4, element 12 slides in lugs 16 projecting from a plate 17 and comprises a fork 18 in which the end of arm 15 engages. When the rotor m1 rotates in the direction of arrow F1, stator m2, by reaction, tends to rotate in the direction of arrow F2, but is prevented from doing so by element 12, which in turn is retained in the position shown in FIGS. 2, 4 and 5, by a shoe 21 acted upon by a spring 22. Shoe 21 has a triangular projection forming an abutment, the inclined surfaces of which cooperate with a corresponding abutment 12a of element 12 (FIG. 2). The power of spring 22 is made such that element 12 is held until the moment of reaction of stator m2 exceeds the normal value required for driving potentiometer P, and so that element 12 changes position when the moment of reaction increases considerably, when the potentiometer cursor reaches its limit abutment.

The change in the position of element 12 causes the motor to be supplied by cell S2, the polarity of which is the reverse of that cell S1; rotor $m1$ rotates in the direction of arrow F2 and the moment of reaction of the stator acts in the direction of arrow F1.

Rotor $m1$ drives shaft 11 via a reducing gear 24 (FIG. 1). Potentiometer P, whose shaft $p1$ is connected to shaft 11 via a sleeve 25 (FIG. 1) can rotate through 10 revolutions, and reduction gear 24 has a reduction ratio of 1/200, so that rotor $m1$ rotates 2,000 revolutions during the complete travel of the potentiometer cursor.

Shaft 11 also drives a digital counter CP of known construction, comprising a first decade drum 26 which is secured to shaft 11 and which, at each revolution, drives a gear wheel 27 which in turn drives the next drum 28 by one step. Similarly, at each revolution, drum 28 drives a gear wheel 29, thus rotating the last drum 31 by one step. Each drum bears a row of ten figures which move under windows in cover 3.

Counter CP is adjusted so that the numbers 34.0 and 44.0 appear in the windows when the potentiometer is adjusted to its two extreme positions, which are separated from one another by ten revolutions of shaft 11 and of contour drum 26.

In the alternative embodiment illustrated in FIG. 7, the drum counter may be replaced by a tape counter 80. In the counter, a tape 81 is driven by a toothed wheel 82 secured to shaft 11. The tape bears graduating marks which move under a window 83 in the cover. Tape 81 may inter alia be a metal tape which has been prestressed so that it automatically winds up into recesses 84, 85 disposed on each side of window 83.

The characteristics of the Wheatstone bridge are chosen so that the bridge is balanced, firstly, at a temperature of 34.0°C of thermistor 6 of the probe, when potentiometer F is in its extreme position where the resistance is smallest and, secondly, at a probe temperature of 44.0° when the potentiometer is in its position at which the resistance is greatest, the variation being linear between these two extreme positions.

Relay F comprises a movable armature 32 pivoted at 33 (FIG. 2). An arm 34 of armature 32, adapted to be pressed against the core of relay F, is disposed in the path of a rod 35 secured to a press-button 36. When arm 34 is pressed against the relay core, an end part 34a of the arm presses the moving contacts G1, H1 of switches G, H (FIGS. 2 and 5) thus closing the last-mentioned switches. A spring 37 tends to return the press-button into an inoperative position. A second arm 38 of armature 32 forms an abutment for a stop catch 39 adapted to cooperate with a toothed wheel 41 secured to sleeve 25. When arm 34 presses against the relay core, arm 38 holds catch 39 at a distance from wheel 41, as shown in FIG. 3, under the action of a spring 42. Wheel 41 has ten teeth. They are angularly distributed so that, at stop positions which are determined by the catch 39, the figures on the counter drum are framed in the windows.

Probe T is given to the patient whose temperature is to be measured, when the temperature indicated by the counter is the minimum value (34.0) corresponding to the minimum resistance of potentiometer P. The reversing mechanism IN is then in the position diagrammatically shown in FIG. 5 Next, pressure is exerted on button 36, thus pressing arm 34 of armature 32 against the core of relay F and closing the two switches G and H.

The motor is thus energized by cell S1, its rotor $m1$ rotating in the direction of arrow F1, and motor terminal 43 (FIG. 5) is connected to the movable element 12 of the reversing mechanism and is at a negative potential. A circuit C2, which short-circuits the resistance R2 of the bridge, connects terminal 43 to the input $a2$ of amplifier A, which is thus kept at a negative potential with respect to the potential of input $a1$.

In this manner, the amplifier output $a6$ is kept positive, so that relay F continues to be energized by transistor TR. Accordingly, armature 32 remains attached to the relay core and motor M drives the potentiometer up to its maximum-resistance position, the value indicated in the counter increasing to 44.0 after 10 revolutions of the shaft and of the potentiometer.

When the potentiometer cursor $p2$ reaches its limit position, the moment of reaction of the motor stator $m2$ abruptly increases, thus rotating the stator in the direction of arrow F2, and thus changing the position of element 12 of the reversing mechanism, which thus comes against terminal 14. Motor M is then energized by cell S2, and its rotor $m1$ rotates in the direction of arrow F2.

Owing to the presence of a diode D2 in circuit C2, the change of polarity at terminal 43 does not affect the Wheatstone bridge and the potential at $a1$ remains higher than the potential at $a2$, since the potentiometer is at its high-resistance position. Consequently, relay F continues to be energized at the instant when the direction of rotation of motor M changes.

The rotation of rotor $m1$ in the direction of F2, which reduces the potentiometer resistance, continues until the bridge is in equilibrium, thus cutting off the supply to relay F. Armature 32 is released and catch 39 engages in wheel 41 and secures shaft 11, when the figures shown in counter CP indicate the patient's temperature.

When shaft 11 is stopped by catch 39, there is an abrupt increase in the moment of reaction of stator $m2$, which then rotates in the direction of arrow F1 and returns the reversing mechanism to its initial position as shown in FIG. 5. Since switch G is open, the motor remains inoperative and there is no consumption of electricity. The thermometer is then ready for a new measurement.

If the temperature of probe T is below 34.0°, rotor $m2$ continues to rotate along F2 until the position of reversing mechanism IN changes because the potentiometer cursor has reached its bottom abutment. Terminal 43 is then connected to negative potential, thus causing the discharge of a capacitor CO connected in a circuit C3 which is coupled to the base of transistor TR so that the base momentarily becomes negative. The change in the base potential cuts off the power supply to relay F, whose armature 32 falls into its inoperative position and opens the two switches G and H. The thermometer, which is in the bottom position, is then ready for a new temperature measurement.

As can be seen, the actuating means $m1$, IN, 39 are so designed that, when a measurement is made, the potentiometer shaft $p1$ first rotates in the direction corresponding to a displayed increasing temperature until cursor $p2$ reaches its limit position, after which shaft $p1$ automatically rotates in the opposite direction until it stops in a position at which the bridge is balanced.

In the embodiment shown in FIG. 6, the shaft of an electric motor 50 bears a gearwheel 51 adapted to engage toothed discs 52, 53 secured to a shaft 54. Shaft 54 constitutes the rotating regulating means of a potentiometer 55, which is of the same known kind as potentiometer P in the first embodiment. The casing 56 of potentiometer 55 is pivotable in a holder 57. A cam 58 secured to casing 56 cooperates with a spring button 59. Casing 56 comprises a radial arm 61 engaging in an aperture 62 formed in a slide 63 bearing motor 50. Aperture 62 enables casing 56 to tilt to a limited extent, and cam 58 is constructed so that the casing instantaneously changes form one to the other of its two angular positions indicated by lines 64 and 65 (FIG. 6) when the moment of reaction appreciably exceeds the normal value corresponding to the actuation of the potentiometer.

Aperture 62 comprises lateral slots 66, 67 which are offset in the direction of motion of slide 63, which can move in guides 68 and 69. Slopes 71 are provided between slots 66, 67 and slide 63 is brought into two different longitudinal positions depending on whether arm 61 occupies one or the other of its extreme angular positions. In the position shown, arm 61 is disposed along line 64 in slot 66 and slide 63 has moved to the left. In this position, gearwheel 51 engages disc 52 and, when the motor is rotating in the direction indicated by arrow F5, shaft 54 is driven in the direction of arrow F6 corresponding to an increase in the electric resistance of the potentiometer. When the cursor reaches its end abutment, the moment of reaction exerted on casing 56 suddenly increases, thus pivoting casing 56 in the direction of arrow F6. Arm 61 then changes its angular position and moves slide 63 to the right, thus bringing gearwheel 51 into engagement with disc 53. Shaft 54 then rotates in the direction of arrow F7. The potentiometer cursor is then driven in the direction of a decrease in resistance and, after balancing of the electric measuring bridge constructed in the previously mentioned manner, a catch 72 cooperating with a toothed wheel 73 stops the rotation of shaft 54 and a counter 74 driven by shaft 54 and similar to the counter CP of FIG. 1, indicates the measured temperature. Catch 72 is in the form of an arm pivoted about a shaft parallel with the shaft 54, the arm extending radially from its shaft and being slidable radially along the length of the arm, with respect to its shaft to a limited extent when it engages the wheel, thus causing a finger 75 of the catch 72 to act on a switch (not shown) and de-energizes motor 50. The catch 72 arrests the shaft 54 in positions in which the digits on the decade drums of counter 74 are aligned with the display window of the counter. When catch 72 is returned to its inoperative position by a control button (not shown) the motor is again energized and continues to drive the cursor in the direction of arrow F7 up to its limit position, whereupon arm 61 returns to slot 66 and brings the slide back to the left, into the position as shown.

The leftward motion of slide 63 moves gearwheel 51 into engagement with disc 52 and also opens a contact 76 which cuts off the motor supply. Switch 76, which comprises a sliding element 77 which is moved back by the slide when it moves to the right, needs to be manually closed before making a new temperature measurement, which is done by the same cycle of operations as already described.

Consequently, the control means 50, 61, 63, 72 are such that, during a measurement, the potentiometer shaft 54 first rotates in the direction corresponding to a displayed increasing temperature and then rotates in the opposite direction until it stops in the position where the bridge is balanced, determined by the catch 72.

If the probe temperature is below 34°, catch 72 does not act and the motor does not stop until the potentiometer reaches its limit position, when the potentiometer casing tilts.

The electrical circuitry used for the embodiment of FIG. 6 can be substantially that of FIG. 5 with the motor M, and connections thereto, the terminals 13, 14 and connections thereto and the circuits C2 and C3 all omitted, the switch G replaced by a permanent electrical connection, the switch H replaced by the switch 76 (with the switch operated by finger 75 in parallel with switch 76) and the relay F replaced by an electro magnetic device which when de-energized, indicating balancing of the bridge, allows the catch 72 to drop onto the wheel 73. As is shown in FIG. 6, the wheel 73 is constructed as a ratchet wheel so that when the shaft 54 is rotating in the direction of the arrow F6, the catch 72, when dropped onto the wheel 73 simply rides over the teeth of the latter. The motor 50 in the electrical circuitry for the embodiment of FIG. 6 may simply by connected across the same power supply lines as the amplifier A.

In the two embodiments which have been described, the potentiometer is controlled by an electric motor which actuates the potentiometer cursor so as to scan the entire range of resistance of the potentiometer, by alternately rising and descending, and the potentiometer control means is reversed automatically, when necessary, by reversing means actuated as a result of the increase in the moment of reaction acting on an element, when the potentiometer reaches its limit positions.

In the first embodiment, the stator m2 of the motor actuates the electric reversing mechanism IN modifying the motor coupling. In the second embodiment, the potentiometer casing 56 actuates the slide 63 modifying the position of the reversing gear mechanism.

The aforementioned reversing mechanisms have the advantage of using the kinetic energy which has accumulated in the rotating device in order to reverse the direction of rotation. This saves power, which is valuable in the case of portable battery-driven apparatus.

The potentiometer cursor moves over its entire range during each measurement, thus ensuring more uniform operation owing to the repeated, complete scanning of the resistance.

The use of digital counters makes it easy to read the measured temperature.

Finally, the potentiometer, the digital counter and the motor, which together form most of the thermometer apparatus, can be standard elements which can be cheaply obtained commercially.

We claim:

1. a medical thermometer comprising a probe containing a thermistor, an electric motor, a potentiometer having a wiper movable between two extreme limit abutments, a mechanical digital counter, driving means for said potentiometer wiper including an electric motor means coupling said counter mechanically with said potentiometer for indicating the position of the potentiometer wiper, an electrical circuit power supply means for said electrical circuit, a resistance comparing bridge connected in said electrical circuit, said thermistor and said potentiometer being included in said bridge whereby for temperatures of said probe between upper and lower limits the bridge can be balanced by a corresponding setting of the potentiometer, balance detecting means in said electrical circuit for detecting balancing of said bridge, control means operable by said balance detecting means for arresting said potentiometer wiper and said driving means when balancing is detected, and further means operable to place the potentiometer wiper at one of its limit abutments and to cause said driving means thereafter to move the potentiometer wiper towards its other limit abutment, said driving means including means for reversing the movement of said potentiometer wiper when said other limit abutment is reached, means rendering said control means inoperable for arresting said potentiometer wiper and driving means during movement of said potentiometer wiper from said one to said other limit abutment and rendering said control means operative during movement of said potentiometer wiper on the opposite direction whereby said potentiometer wiper and driving means are arrested when balance is detected during the latter movement, said counter then displayed the temperature of the probe, wherein said counter is a tape counter which comprises a metal tape, a wheel engaging the tape and secured to the counter input shaft and first and second compartments between which the tape extends, and wherein said tape is of metal and is prestressed so as to coil up automatically in said compartments.

2. The thermometer of claim 1 wherein said means for reversing the movement of said potentiometer wiper is a switch operable to reverse the polarity of the power supply to said electric motor when said wiper is moved.

* * * * *